(12) United States Patent  
Urata et al.

(10) Patent No.: US 9,821,866 B1  
(45) Date of Patent: Nov. 21, 2017

(54) ROTATABLE ROBOT FOOT WITH PERPENDICULAR SOLES

(71) Applicant: Schaft Inc., Tokyo (JP)

(72) Inventors: Junichi Urata, Tokyo (JP); Yoshito Ito, Tokyo (JP)

(73) Assignee: Schaft Inc., Tokyo (JP)

( * ) Notice: Subject to any disclaimer, the term of this patent is extended or adjusted under 35 U.S.C. 154(b) by 84 days.

(21) Appl. No.: 14/939,077

(22) Filed: Nov. 12, 2015

(51) Int. Cl.
*B25J 5/00* (2006.01)
*B25J 9/16* (2006.01)
*B62D 57/032* (2006.01)

(52) U.S. Cl.
CPC .............. *B62D 57/032* (2013.01); *B25J 5/00* (2013.01); *B25J 9/16* (2013.01)

(58) Field of Classification Search
CPC .............. B25J 9/16; B25J 5/00; B62D 57/032
See application file for complete search history.

(56) References Cited

U.S. PATENT DOCUMENTS

| 5,127,484 A | 7/1992 | Bares et al. |
| 5,421,426 A | 6/1995 | De Beaucourt et al. |
| 5,551,525 A | 9/1996 | Pack et al. |
| 7,240,747 B2 * | 7/2007 | Miyazaki ............. B25J 17/0275 180/8.1 |
| 2008/0245584 A1* | 10/2008 | Takenaka ............. B62D 57/032 180/8.1 |

* cited by examiner

*Primary Examiner* — Thomas Ingram
(74) *Attorney, Agent, or Firm* — Honigman Miller Schwartz and Cohn LLP (57) ABSTRACT

Example embodiments relate to a robotic device with at least two legs. Each leg includes a foot including a first sole and a second sole perpendicular to the first sole. Each leg additionally includes an ankle joint configured to rotate the foot from a first position in which the first sole is contacting a ground surface to a second position in which the second sole is contacting the ground surface. The robotic device includes a control system. When the foot of a given leg of the at least two legs is in the first position, the control system may determine to cause the foot of the given leg to switch from the first position to the second position, and may cause the ankle joint of the given leg to rotate the foot of the given leg from the first position to the second position.

20 Claims, 9 Drawing Sheets

ROTATABLE ROBOT FOOT WITH PERPENDICULAR SOLES

BACKGROUND

As technology advances, various types of robotic devices are being created for performing a variety of functions that may assist users. Robotic devices may be used for applications involving material handling, transportation, welding, assembly, and dispensing, among others. Over time, the manner in which these robotic systems operate is becoming more intelligent, efficient, and intuitive. As robotic systems become increasingly prevalent in numerous aspects of modern life, it is desirable for robotic systems to be efficient. Therefore, a demand for efficient robotic systems has helped open up a field of innovation in actuators, movement, sensing techniques, as well as component design and assembly.

SUMMARY

The present application describes implementations that relate to a rotatable foot for a walking robot. An example foot includes a first sole and a second sole perpendicular to the first sole. When the first sole of the foot is contacting the ground, the robot may determine to rotate the foot so that the second sole contacts the ground. The robot may then cause an ankle joint to rotate the foot so that the second sole contacts the ground and provides support for the robot.

In one example, a robotic device is described, including at least two legs. Each leg includes a foot comprising a first sole and a second sole perpendicular to the first sole. Each leg additionally includes an ankle joint configured to rotate the foot from a first position in which the first sole is contacting a ground surface to a second position in which the second sole is contacting the ground surface. The robotic device also includes a control system. When the foot of a given leg of the at least two legs is in the first position, the control system may determine to cause the foot of the given leg to switch from the first position to the second position. The control system may cause the ankle joint of the given leg to rotate the foot of the given leg from the first position to the second position.

In a further example, a method is described that includes providing instructions for a robotic device to walk on a ground surface by alternatively placing a first sole of a first foot and a first sole of a second foot on the ground surface, wherein the first foot is attached to a first leg and the second foot is attached to a second leg. When a given foot of the first foot and the second foot is on the ground surface, the method further includes determining to cause the given foot to switch from a first position in which the first sole of the given foot is contacting the ground surface to a second position in which a second sole of the given foot is contacting the ground surface, where the first sole of the given foot of the robotic device is perpendicular to the second sole of the given foot of the robotic device. The method additionally includes causing an ankle joint of a given leg to which the given foot is attached to rotate the given foot from the first position in which the first sole of the given foot is contacting the ground surface to the second position in which the second sole of the given foot is contacting the ground surface.

In another example, a leg for a robotic device is described. The leg includes a foot, which includes a first sole, and a second sole connected to an edge of the first sole such that the second sole is perpendicular to the first sole. The leg further includes an ankle joint configured to rotate the foot from a first position in which the first sole of the foot is contacting a ground surface to a second position in which the second sole of the foot is contacting the ground surface.

In yet another example, a system is described. The system includes means for providing instructions for a robotic device to walk on a ground surface by alternatively placing a first sole of a first foot and a first sole of a second foot on the ground surface, wherein the first foot is attached to a first leg and the second foot is attached to a second leg. When a given foot of the first foot and the second foot is on the ground surface, the system further includes means for determining to cause the given foot to switch from a first position in which the first sole of the given foot is contacting the ground surface to a second position in which a second sole of the given foot is contacting the ground surface, where the first sole of the given foot of the robotic device is perpendicular to the second sole of the given foot of the robotic device. The system additionally includes means for causing an ankle joint of a given leg to which the given foot is attached to rotate the given foot from the first position in which the first sole of the given foot is contacting the ground surface to the second position in which the second sole of the given foot is contacting the ground surface.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

Example embodiments relate to a rotatable foot for a walking robot. Within examples, the foot includes two perpendicular soles, a first sole and a second sole connected to the first sole along an edge of the first sole. The robot may typically walk on the foot by contacting the ground with the first sole of the foot. Because the second sole is perpendicular to the first sole, it may not protrude or interfere with a robot's walking cycle. When the first sole of the foot is on the ground, the robot may encounter a scenario in which the robot is at risk of tipping over in the direction of the second sole, for instance, when the robot is pushed from the side. In this scenario, the robot may use an ankle joint to rotate the foot from a first position in which the first sole is contacting the ground to a second position in which the second sole is contacting the ground. The second sole may provide the robot with another opportunity to balance itself and avoid tipping over.

An example walking robot has two legs, each with an attached foot that includes two perpendicular soles. The second sole of each foot may be connected to the first sole along an edge of the first sole which faces away from the opposing leg. This arrangement may allow the robot to compensate for unexpected horizontal forces which may otherwise cause the robot to tip over. For example, a robot may be pushed when the robot's left foot is on the ground and the robot's right foot is swinging through the air. In such a scenario, the robot may attempt to adjust where the robot places its right foot in an effort to avoid tipping over. However, if the robot is pushed in a direction toward the left foot, adjusting placement of the right foot may cause the robot's legs to collide, which may result in the robot tipping over. Instead of adjusting placement of the right foot, the robot may instead rotate the left foot onto the second sole of the left foot in an effort to retain balance.

A control system of a robot may determine when to cause an ankle joint to rotate a foot of the robot from a first position in which the first sole of the foot is contacting the ground to a second position in which the second sole of the foot is contacting the ground based on a number of different factors. For instance, as described above, the control system may determine that a collision between the legs of the robot is predicted to occur, or has already occurred. The control system may then responsively cause the ankle joint of the robot's stance foot to rotate onto the second sole.

In further examples, the control system of the robot may determine a zero moment point (ZMP) on the first sole of the stance foot of the robot. If the ZMP on the first sole is determined to be at or near the edge to which the second sole is connected, the control system of the robot may make a determination to cause the ankle joint to rotate the foot onto the second sole. In some examples, each leg or foot of the robot may have one or more force-torque sensors to help determine the ZMP on the robot's stance foot.

In additional examples, the control system of the robot may determine when to rotate a foot of the robot from the first sole to the second sole based on one or more joint angles of one or more joints in the robot's legs. For instance, the joint angles may be used to predict when the robot may be at risk of tipping over, at which point the ankle joint corresponding to the robot's stance foot may be actuated to rotate the stance foot from the first sole onto the second sole.

In some examples, after the robot has rotated its stance foot to cause the second sole of the stance foot to contact the ground surface, the robot may be controlled to continue walking by contacting the ground with the second sole of the foot. In other examples, once the robot has regained balance, the robot may first rotate the stance foot back to a position in which the first sole of the foot is contacting the ground before continuing to walk on the ground surface.

In further examples, the second sole of a given foot of a robot may be attached to a different edge of the first sole (as opposed to the outer edge). In additional examples, a foot of a robot may have multiple perpendicular soles attached to different edges of the first sole (e.g., to help prevent the robot from tipping over in different directions). In further examples, a robotic device may have one, two, four, or a different number of feet that include perpendicular soles. The shapes and sizes of individual feet and/or soles may also be varied from those explicitly illustrated and described herein.

Figure 1:
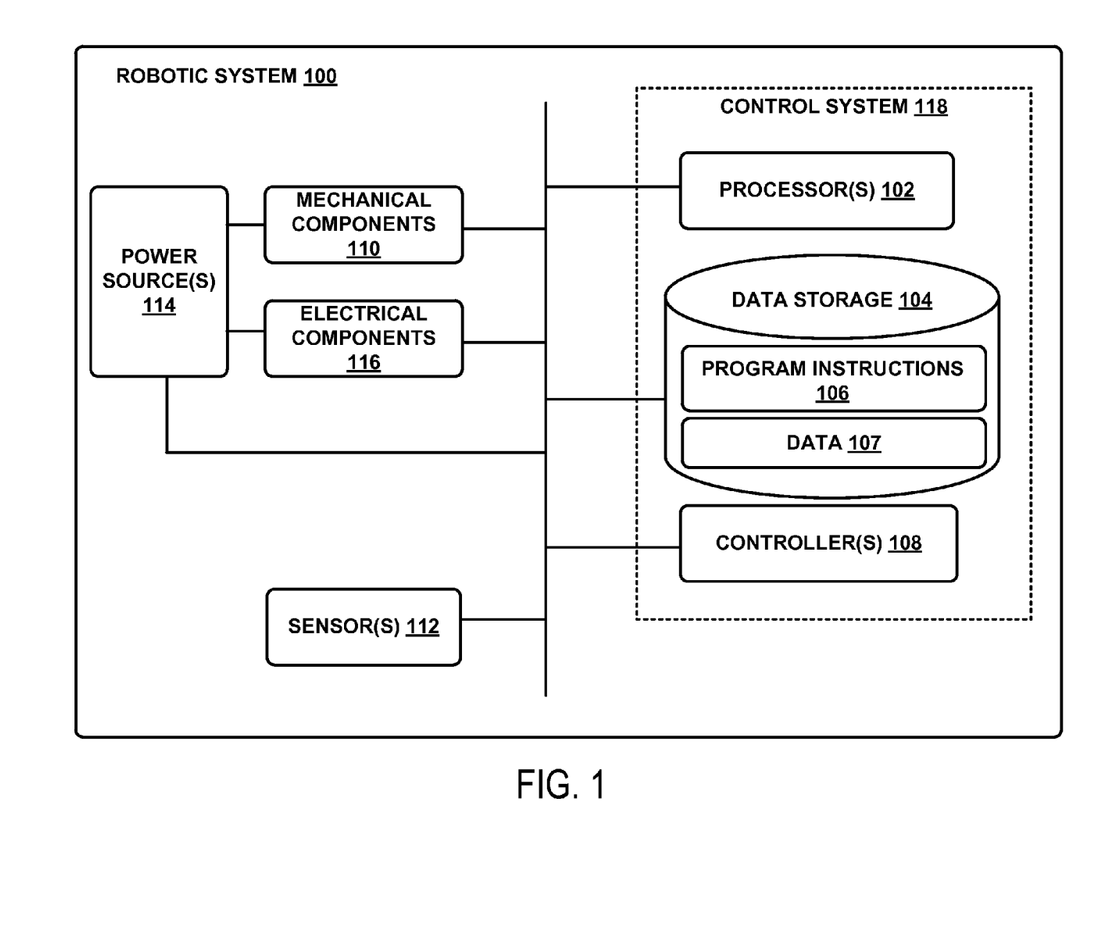
FIG. 1 illustrates a configuration of a robotic system, according to an example embodiment.

FIG. 1 illustrates an example configuration of a robotic system that may be used in connection with the implementations described herein. The robotic system 100 may be configured to operate autonomously, semi-autonomously, and/or using directions provided by user(s). The robotic system 100 may be implemented in various forms, such as a biped robot, quadruped robot, or some other arrangement. Furthermore, the robotic system 100 may also be referred to as a robot, robotic device, or mobile robot, among other designations.

As shown in FIG. 1, the robotic system 100 may include processor(s) 102, data storage 104, and controller(s) 108, which together may be part of a control system 118. The robotic system 100 may also include sensor(s) 112, power source(s) 114, mechanical components 110, and electrical components 116. Nonetheless, the robotic system 100 is shown for illustrative purposes, and may include more or fewer components. The various components of robotic system 100 may be connected in any manner, including wired or wireless connections. Further, in some examples, components of the robotic system 100 may be distributed among multiple physical entities rather than a single physical entity. Other example illustrations of robotic system 100 may exist as well.

Processor(s) 102 may operate as one or more general-purpose hardware processors or special purpose hardware processors (e.g., digital signal processors, application specific integrated circuits, etc.). The processor(s) 102 may be configured to execute computer-readable program instructions 106, and manipulate data 107, both of which are stored in the data storage 104. The processor(s) 102 may also directly or indirectly interact with other components of the robotic system 100, such as sensor(s) 112, power source(s) 114, mechanical components 110, and/or electrical components 116.

The data storage 104 may be one or more types of hardware memory. For example, the data storage 104 may include or take the form of one or more computer-readable storage media that can be read or accessed by processor(s) 102. The one or more computer-readable storage media can include volatile and/or non-volatile storage components, such as optical, magnetic, organic, or another type of memory or storage, which can be integrated in whole or in part with processor(s) 102. In some implementations, the data storage 104 can be a single physical device. In other implementations, the data storage 104 can be implemented using two or more physical devices, which may communicate with one another via wired or wireless communication. As noted previously, the data storage 104 may include the computer-readable program instructions 106 and the data 107. The data 107 may be any type of data, such as configuration data, sensor data, and/or diagnostic data, among other possibilities.

The controller 108 may include one or more electrical circuits, units of digital logic, computer chips, and/or microprocessors that are configured to (perhaps among other tasks), interface between any combination of the mechanical components 110, the sensor(s) 112, the power source(s) 114, the electrical components 116, the control system 118, and/or a user of the robotic system 100. In some implementations, the controller 108 may be a purpose-built embedded device for performing specific operations with one or more subsystems of the robotic device 100.

The control system 118 may monitor and physically change the operating conditions of the robotic system 100. In doing so, the control system 118 may serve as a link between portions of the robotic system 100, such as between mechanical components 110 and/or electrical components 116. In some instances, the control system 118 may serve as an interface between the robotic system 100 and another computing device. Further, the control system 118 may serve as an interface between the robotic system 100 and a user. The instance, the control system 118 may include various components for communicating with the robotic system 100, including a joystick, buttons, and/or ports, etc. The example interfaces and communications noted above may be implemented via a wired or wireless connection, or both. The control system 118 may perform other operations for the robotic system 100 as well.

During operation, the control system 118 may communicate with other systems of the robotic system 100 via wired or wireless connections, and may further be configured to communicate with one or more users of the robot. As one possible illustration, the control system 118 may receive an input (e.g., from a user or from another robot) indicating an instruction to perform a particular gait in a particular direction, and at a particular speed. A gait is a pattern of movement of the limbs of an animal, robot, or other mechanical structure.

Based on this input, the control system 118 may perform operations to cause the robotic device 100 to move according to the requested gait. As another illustration, a control system may receive an input indicating an instruction to move to a particular geographical location. In response, the control system 118 (perhaps with the assistance of other components or systems) may determine a direction, speed, and/or gait based on the environment through which the robotic system 100 is moving en route to the geographical location.

Operations of the control system 118 may be carried out by the processor(s) 102. Alternatively, these operations may be carried out by the controller 108, or a combination of the processor(s) 102 and the controller 108. In some implementations, the control system 118 may partially or wholly reside on a device other than the robotic system 100, and therefore may at least in part control the robotic system 100 remotely.

Mechanical components 110 represent hardware of the robotic system 100 that may enable the robotic system 100 to perform physical operations. As a few examples, the robotic system 100 may include physical members such as leg(s), arm(s), and/or wheel(s). The physical members or other parts of robotic system 100 may further include actuators arranged to move the physical members in relation to one another. The robotic system 100 may also include one or more structured bodies for housing the control system 118 and/or other components, and may further include other types of mechanical components. The particular mechanical components 110 used in a given robot may vary based on the design of the robot, and may also be based on the operations and/or tasks the robot may be configured to perform.

In some examples, the mechanical components 110 may include one or more removable components. The robotic system 100 may be configured to add and/or remove such removable components, which may involve assistance from a user and/or another robot. For example, the robotic system 100 may be configured with removable arms, hands, feet, and/or legs, so that these appendages can be replaced or changed as needed or desired. In some implementations, the robotic system 100 may include one or more removable and/or replaceable battery units or sensors. Other types of removable components may be included within some implementations.

The robotic system 100 may include sensor(s) 112 arranged to sense aspects of the robotic system 100. The sensor(s) 112 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, and/or cameras, among other possibilities. Within some examples, the robotic system 100 may be configured to receive sensor data from sensors that are physically separated from the robot (e.g., sensors that are positioned on other robots or located within the environment in which the robot is operating).

The sensor(s) 112 may provide sensor data to the processor(s) 102 (perhaps by way of data 107) to allow for interaction of the robotic system 100 with its environment, as well as monitoring of the operation of the robotic system 100. The sensor data may be used in evaluation of various factors for activation, movement, and deactivation of mechanical components 110 and electrical components 116 by control system 118. For example, the sensor(s) 112 may capture data corresponding to the terrain of the environment or location of nearby objects, which may assist with environment recognition and navigation. In an example configuration, sensor(s) 112 may include RADAR (e.g., for long-range object detection, distance determination, and/or speed determination), LIDAR (e.g., for short-range object detection, distance determination, and/or speed determination), SONAR (e.g., for underwater object detection, distance determination, and/or speed determination), VICON® (e.g., for motion capture), one or more cameras (e.g., stereoscopic cameras for 3D vision), a global positioning system (GPS) transceiver, and/or other sensors for capturing information of the environment in which the robotic system 100 is operating. The sensor(s) 112 may monitor the environment in real time, and detect obstacles, elements of the terrain, weather conditions, temperature, and/or other aspects of the environment.

Further, the robotic system 100 may include sensor(s) 112 configured to receive information indicative of the state of the robotic system 100, including sensor(s) 112 that may monitor the state of the various components of the robotic system 100. The sensor(s) 112 may measure activity of systems of the robotic system 100 and receive information based on the operation of the various features of the robotic system 100, such the operation of extendable legs, arms, or other mechanical and/or electrical features of the robotic system 100. The data provided by the sensor(s) 112 may enable the control system 118 to determine errors in operation as well as monitor overall operation of components of the robotic system 100.

As an example, the robotic system 100 may use force sensors to measure load on various components of the robotic system 100. In some implementations, the robotic system 100 may include one or more force sensors on an arm or a leg to measure the load on the actuators that move one or more members of the arm or leg. As another example, the robotic system 100 may use one or more position sensors to sense the position of the actuators of the robotic system. For instance, such position sensors may sense states of extension, retraction, or rotation of the actuators on arms or legs.

As another example, the sensor(s) 112 may include one or more velocity and/or acceleration sensors. For instance, the sensor(s) 112 may include an inertial measurement unit (IMU). The IMU may sense velocity and acceleration in the world frame, with respect to the gravity vector. The velocity and acceleration sensed by the IMU may then be translated to that of the robotic system 100 based on the location of the IMU in the robotic system 100 and the kinematics of the robotic system 100.

The robotic system 100 may include other types of sensors not explicated discussed herein. Additionally or alternatively, the robotic system may use particular sensors for purposes not enumerated herein.

The robotic system 100 may also include one or more power source(s) 114 configured to supply power to various components of the robotic system 100. Among other possible power systems, the robotic system 100 may include a hydraulic system, electrical system, batteries, and/or other types of power systems. As an example illustration, the robotic system 100 may include one or more batteries configured to provide charge to components of the robotic system 100. Some of the mechanical components 110 and/or electrical components 116 may each connect to a different power source, may be powered by the same power source, or be powered by multiple power sources.

Any type of power source may be used to power the robotic system 100, such as electrical power or a gasoline engine. Additionally or alternatively, the robotic system 100 may include a hydraulic system configured to provide power to the mechanical components 110 using fluid power. Components of the robotic system 100 may operate based on hydraulic fluid being transmitted throughout the hydraulic system to various hydraulic motors and hydraulic cylinders, for example. The hydraulic system may transfer hydraulic power by way of pressurized hydraulic fluid through tubes, flexible hoses, or other links between components of the robotic system 100. The power source(s) 114 may charge using various types of charging, such as wired connections to an outside power source, wireless charging, combustion, or other examples.

The electrical components 116 may include various mechanisms capable of processing, transferring, and/or providing electrical charge or electric signals. Among possible examples, the electrical components 116 may include electrical wires, circuitry, and/or wireless communication transmitters and receivers to enable operations of the robotic system 100. The electrical components 116 may interwork with the mechanical components 110 to enable the robotic system 100 to perform various operations. The electrical components 116 may be configured to provide power from the power source(s) 114 to the various mechanical components 110, for example. Further, the robotic system 100 may include electric motors. Other examples of electrical components 116 may exist as well.

Although not shown in FIG. 1, the robotic system 100 may include a body, which may connect to or house appendages and components of the robotic system. As such, the structure of the body may vary within examples and may further depend on particular operations that a given robot may have been designed to perform. For example, a robot developed to carry heavy loads may have a wide body that enables placement of the load. Similarly, a robot designed to reach high speeds may have a narrow, small body that does not have substantial weight. Further, the body and/or the other components may be developed using various types of materials, such as metals or plastics. Within other examples, a robot may have a body with a different structure or made of various types of materials.

The body and/or the other components may include or carry the sensor(s) 112. These sensors may be positioned in various locations on the robotic device 100, such as on the body and/or on one or more of the appendages, among other examples.

On its body, the robotic device 100 may carry a load, such as a type of cargo that is to be transported. The load may also represent external batteries or other types of power sources (e.g., solar panels) that the robotic device 100 may utilize. Carrying the load represents one example use for which the robotic device 100 may be configured, but the robotic device 100 may be configured to perform other operations as well.

As noted above, the robotic system 100 may include various types of legs, arms, wheels, and so on. In general, the robotic system 100 may be configured with zero or more legs. An implementation of the robotic system with zero legs may include wheels, treads, or some other form of locomotion. An implementation of the robotic system with two legs may be referred to as a biped, and an implementation with four legs may be referred as a quadruped. Implementations with six or eight legs are also possible. For purposes of illustration, biped and quadruped implementations of the robotic system 100 are described below.

Figure 2:
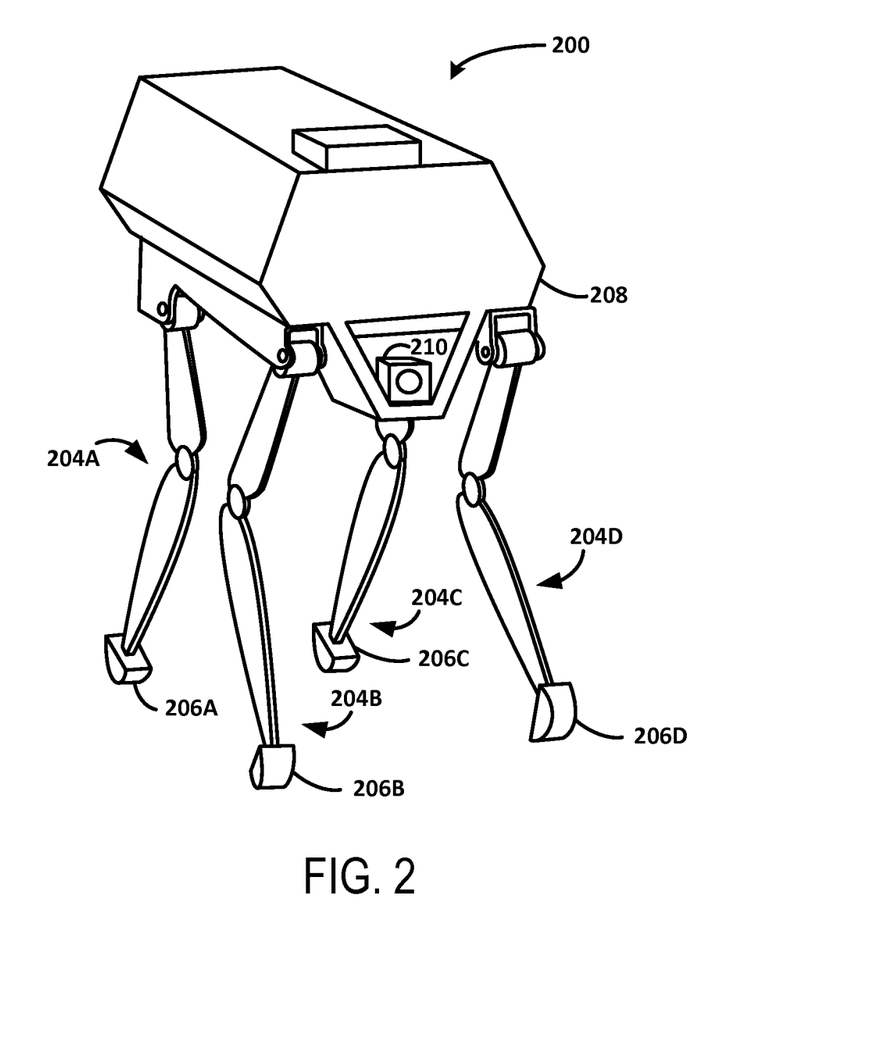
FIG. 2 illustrates a perspective view of a quadruped robot, according to an example embodiment.

FIG. 2 illustrates a quadruped robot 200, according to an example implementation. Among other possible features, the robot 200 may be configured to perform some of the operations described herein. The robot 200 includes a control system, and legs 204A, 204B, 204C, 204D connected to a body 208. Each leg may include a respective foot 206A, 206B, 206C, 206D that may contact a surface (e.g., a ground surface). Further, the robot 200 is illustrated with sensor(s) 210, and may be capable of carrying a load on the body 208. Within other examples, the robot 200 may include more or fewer components, and thus may include components not shown in FIG. 2.

The robot 200 may be a physical representation of the robotic system 100 shown in FIG. 1, or may be based on other configurations. Thus, the robot 200 may include one or more of mechanical components 110, sensor(s) 112, power source(s) 114, electrical components 116, and/or control system 118, among other possible components or systems.

The configuration, position, and/or structure of the legs 204A-204D may vary in example implementations. The legs 204A-204D enable the robot 200 to move relative to its environment, and may be configured to operate in multiple degrees of freedom to enable different techniques of travel. In particular, the legs 204A-204D may enable the robot 200 to travel at various speeds according to the mechanics set forth within different gaits. The robot 200 may use one or more gaits to travel within an environment, which may involve selecting a gait based on speed, terrain, the need to maneuver, and/or energy efficiency.

Further, different types of robots may use different gaits due to variations in design. Although some gaits may have specific names (e.g., walk, trot, run, bound, gallop, etc.), the distinctions between gaits may overlap. The gaits may be classified based on footfall patterns—the locations on a surface for the placement the feet 206A-206D. Similarly, gaits may also be classified based on ambulatory mechanics.

The body 208 of the robot 200 connects to the legs 204A-204D and may house various components of the robot 200. For example, the body 208 may include or carry sensor(s) 210. These sensors may be any of the sensors discussed in the context of sensor(s) 112, such as a camera, LIDAR, or an infrared sensor. Further, the locations of sensor(s) 210 are not limited to those illustrated in FIG. 2. Thus, sensor(s) 210 may be positioned in various locations on the robot 200, such as on the body 208 and/or on one or more of the legs 204A-204D, among other examples.

Figure 3:
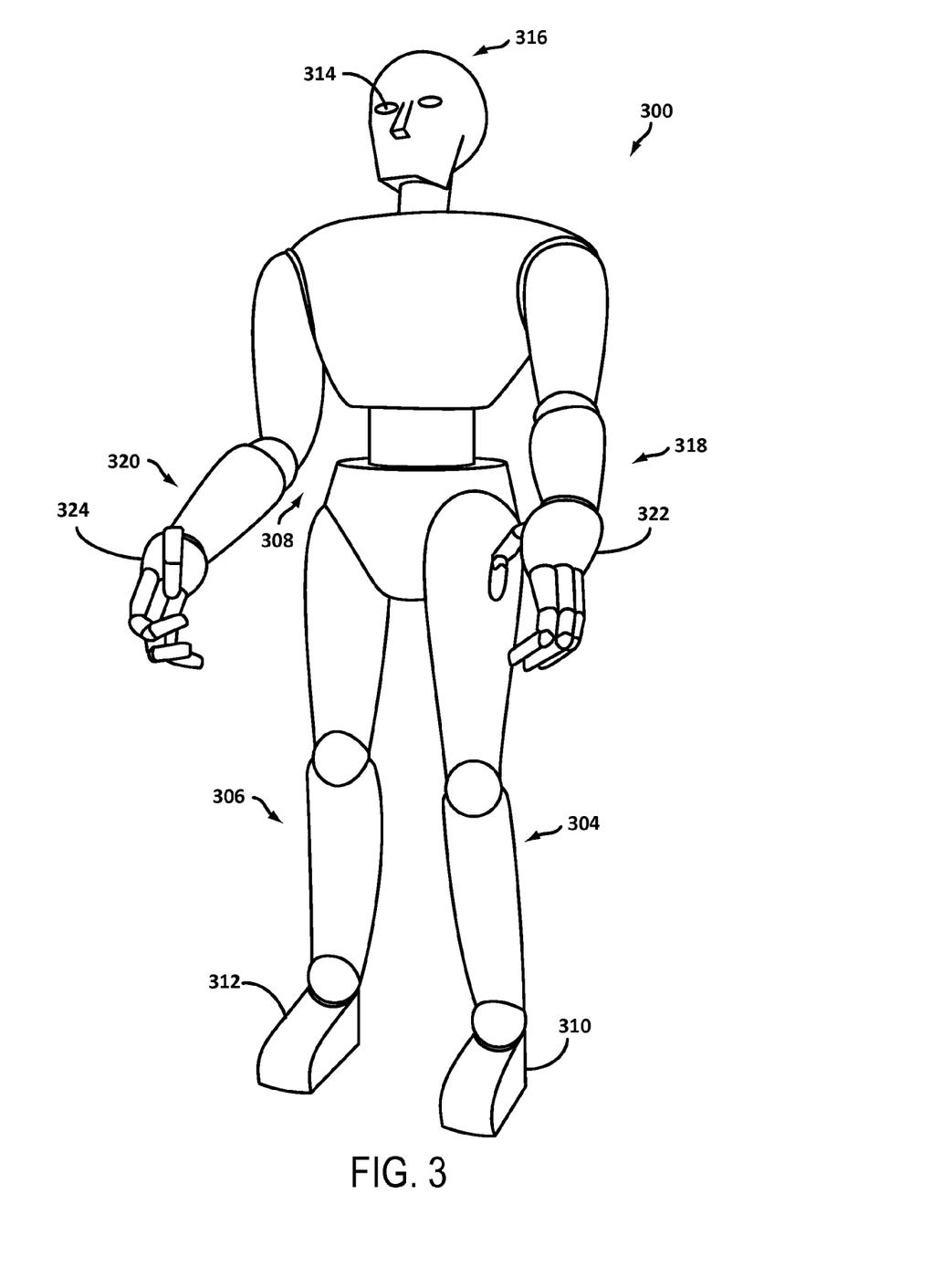
FIG. 3 illustrates a perspective view of a biped robot, according to an example embodiment.

FIG. 3 illustrates a biped robot 300 according to another example implementation. Similar to robot 200, the robot 300 may correspond to the robotic system 100 shown in FIG. 1, and may be configured to perform some of the implementations described herein. Thus, like the robot 200, the robot 300 may include one or more of mechanical components 110, sensor(s) 112, power source(s) 114, electrical components 116, and/or control system 118.

For example, the robot 300 may include legs 304 and 306 connected to a body 308. Each leg may consist of one or more members connected by joints and configured to operate with various degrees of freedom with respect to one another. Each leg may also include a respective foot 310 and 312, which may contact a surface (e.g., the ground surface). Like the robot 200, the legs 304 and 306 may enable the robot 300 to travel at various speeds according to the mechanics set forth within gaits. The robot 300, however, may utilize different gaits from that of the robot 200, due at least in part to the differences between biped and quadruped capabilities.

The robot 300 may also include arms 318 and 320. These arms may facilitate object manipulation, load carrying, and/or balancing for the robot 300. Like legs 304 and 306, each arm may consist of one or more members connected by joints and configured to operate with various degrees of freedom with respect to one another. Each arm may also include a respective hand 322 and 324. The robot 300 may use hands 322 and 324 for gripping, turning, pulling, and/or pushing objects. The hands 322 and 324 may include various types of appendages or attachments, such as fingers, grippers, welding tools, cutting tools, and so on.

The robot 300 may also include sensor(s) 314, corresponding to sensor(s) 112, and configured to provide sensor data to its control system. In some cases, the locations of these sensors may be chosen in order to suggest an anthropomorphic structure of the robot 300. Thus, as illustrated in FIG. 3, the robot 300 may contain vision sensors (e.g., cameras, infrared sensors, object sensors, range sensors, etc.) within its head 316.

Figure 4:
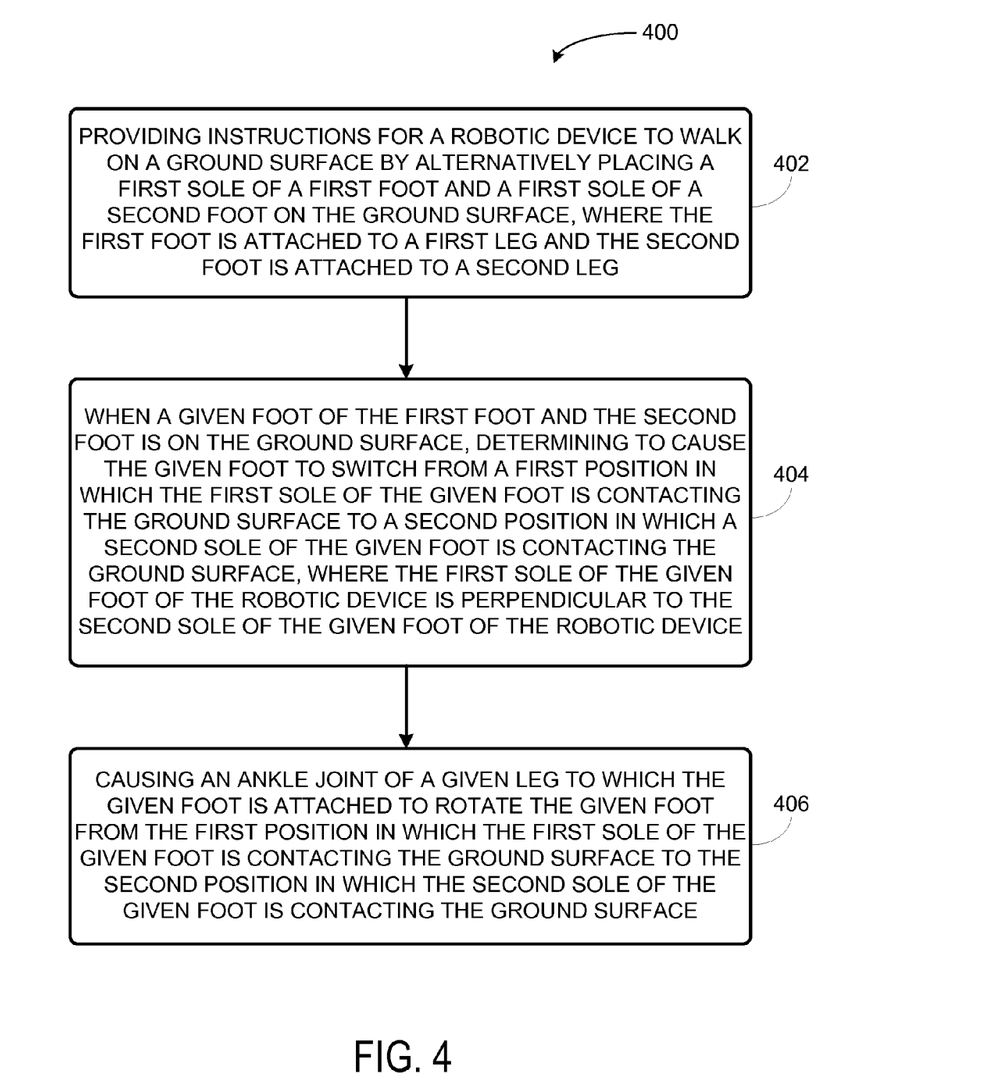
FIG. 4 is a block diagram of a method, according to an example embodiment.

FIG. 4 is a flowchart of an example method 400 for a robotic device walking on a ground surface, according to an example embodiment. Method 400 shown in FIG. 4 presents an embodiment of a method that could be used or implemented by the robot 200 of FIG. 2 and/or the robot 300 of FIG. 3, for example, or more generally by one or more components of any walking robot. Method 400 may include one or more operations, functions, or actions as illustrated by one or more blocks of 402-406. Although the blocks are illustrated in a sequential order, these blocks may also be performed in parallel, and/or in a different order than those described herein. Also, the various blocks may be combined into fewer blocks, divided into additional blocks, and/or removed based upon the directed implementation.

In addition, the method 400 and other processes and methods disclosed herein, the block diagram shows functionality and operation of one possible implementation of present embodiments. In this regard, each block may represent or involve a module, a segment, or a portion of program code, which includes one or more instructions executable by a processor or computing device for implementing specific logical operations or steps in the process. The program code may be stored on any type of computer-readable medium, for example, such as a storage device included a disk or hard drive. The computer-readable medium may include a non-transitory computer-readable medium, for example, such as computer-readable media that stores data for short periods of time like register memory, processor cache and/or random access memory (RAM). The computer-readable medium may also include non-transitory media, such as secondary or persistent long-term storage, like read-only memory (ROM), optical or magnetic disks, and compact-disc read-only memory (CD-ROM), for example. The computer-readable media may be considered a computer-readable storage medium, for example, or a tangible storage device.

In addition, for the method 400 and other processes, methods, and operations described herein, each block in FIG. 4 may represent circuitry that is wired to perform the specific logical operations in the process.

In one embodiment, some or all of the operations of the method 400 may be performed by a control system, such as control system 118 of FIG. 1. In other embodiments, some or all of the operations of method 400 may be distributed across multiple control systems that are interfaced with mechanical components and/or electrical components.

At block 402, the method 400 involves providing instructions for a robotic device to walk on a ground surface by alternatively placing a first sole of a first foot and a first sole of a second foot on the ground surface. One or more control systems located on the robotic device and/or remotely may control actuators to move the robot's feet as the robot navigates across a terrain. Each of the first foot and the second foot may have a second sole perpendicular to the first sole that is connected to an edge of the first sole. The second perpendicular sole of a given foot may generally not protrude when the given foot is in an unrotated position. Accordingly, the second sole of each foot may not disrupt the robot's normal walking cycle. In some examples, the second sole of each foot may be connected to an outer edge of the first sole which faces away from the opposing leg of the robot.

Figure 5A:
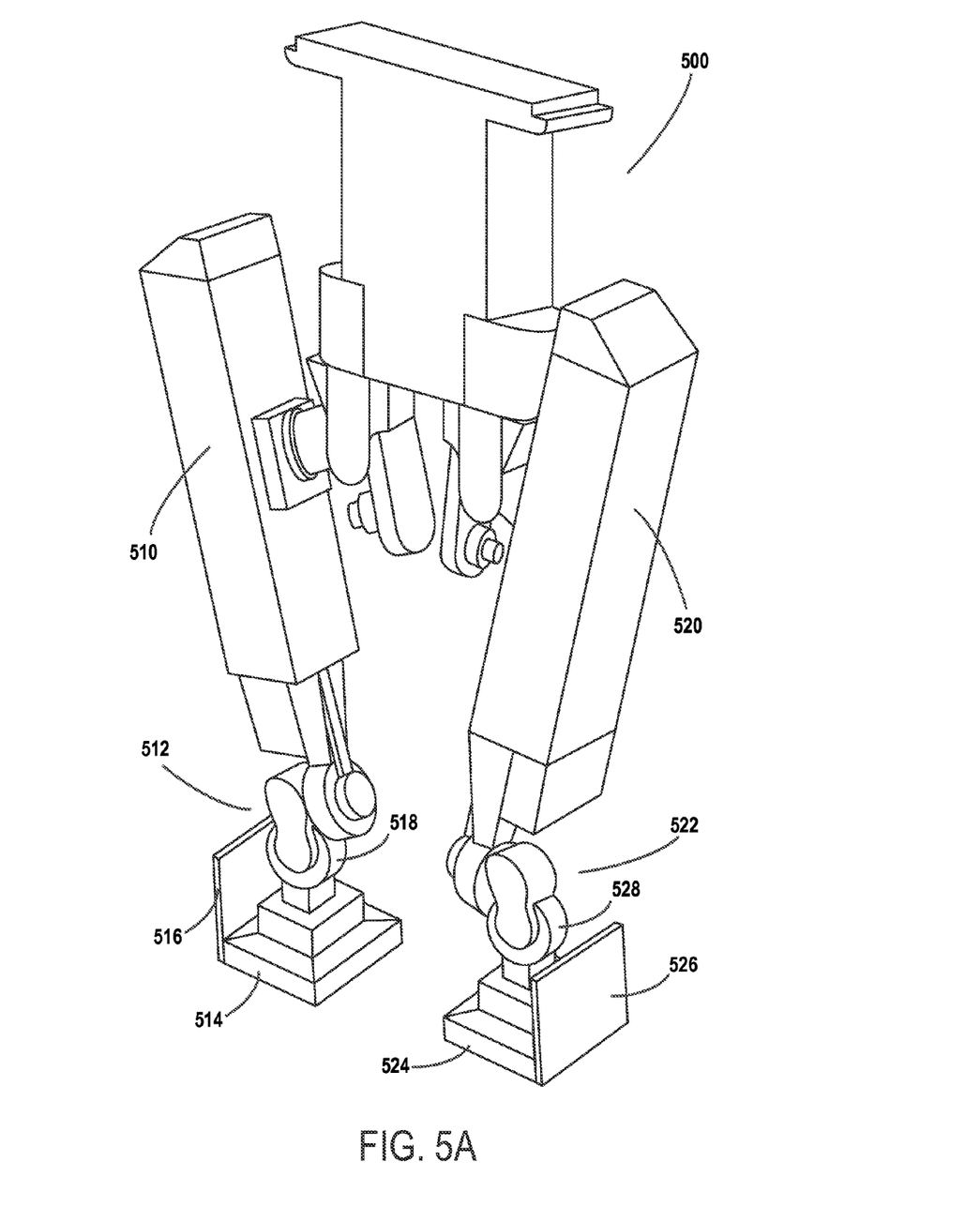
FIGS. 5A-5E illustrate a walking robot with feet that include perpendicular soles, according to an example embodiment.

FIG. 5A illustrates one example of a walking robot with two feet that each include perpendicular soles, according to an example embodiment. More specifically, the robot 500 may include a first leg 510 with an attached first foot 512 and a second leg 520 with an attached second foot 522. The first foot 512 may include a first sole 514 which is used to contact the ground surface during a walking cycle for the robot. The first foot 512 may additionally include a second sole 516 which is perpendicular to the first sole 514. As shown here, the second sole 516 may be connected to the first sole 514 at an outer edge of the first sole 514 which faces away from the second leg 520 of the robot 500 when the robot 500 is in a normal standing position and/or during a standard walking cycle. Similarly, the second leg 520 may include an attached second foot 522 which has a first sole 524 and a perpendicular second sole 526. The second sole 526 may be connected to the first sole 524 of the foot 522 along an edge of the first sole 524 which generally faces away from the first leg 510 of the robot 500.

Each foot 512, 522 of the robot 500 may include a respective ankle joint 518, 528. Within examples, an ankle joint of a robot is a connector between a foot and a leg of the robot that can be actuated to rotate the foot relative to the leg. For instance, the ankle joint 518 shown in FIG. 5A may be configured to rotate the foot 512 relative to the leg 510 from a first position in which the first sole 514 is contacting the ground surface to a second position in which the second sole 516 is contacting the ground surface. Similarly, the ankle joint 528 may be configured to rotate the foot 522 from a first position in which the first sole 524 is contacting the ground to a second position in which the second sole 526 in contacting the ground. Each ankle joint 518, 528 may be separately actuated by a control system of the robot 500.

Within examples, the legs and feet of a robotic device may generally describe support members for a robot's body that may take on other forms or shapes than those illustrated here. In particular, the soles of a foot of the robot may each have a square shape, rectangular shape, or a different shape. The first sole and the second perpendicular sole of a foot may have the same size and shape as each other, or may have different sizes and/or shapes. In additional examples, the second sole of the foot may be connected to the first sole of the foot at an angle less than or greater than 90 degrees (e.g., 80 degrees or 100 degrees). Individual components of the legs and feet may be constructed from a number of different possible materials, including metals, plastics, rubbers, etc.

Each ankle joint of the robot may also have a number of different forms that allow the foot to rotate relative to the leg. In some examples, the ankle joint may include a cylindrical component connected to the foot that rotates around an axis that is fixed relative to the leg, as illustrated in FIG. 5A. The fixed axis of rotation may allow the foot to rotate from a first position in which the first sole of the foot is contacting the ground to a second position in which the second sole is contacting the ground. In further examples, an ankle joint may take the form of a pivot joint, a hinge joint, a saddle joint, a ball-and-socket joint, or a different type of joint.

Figure 5B:
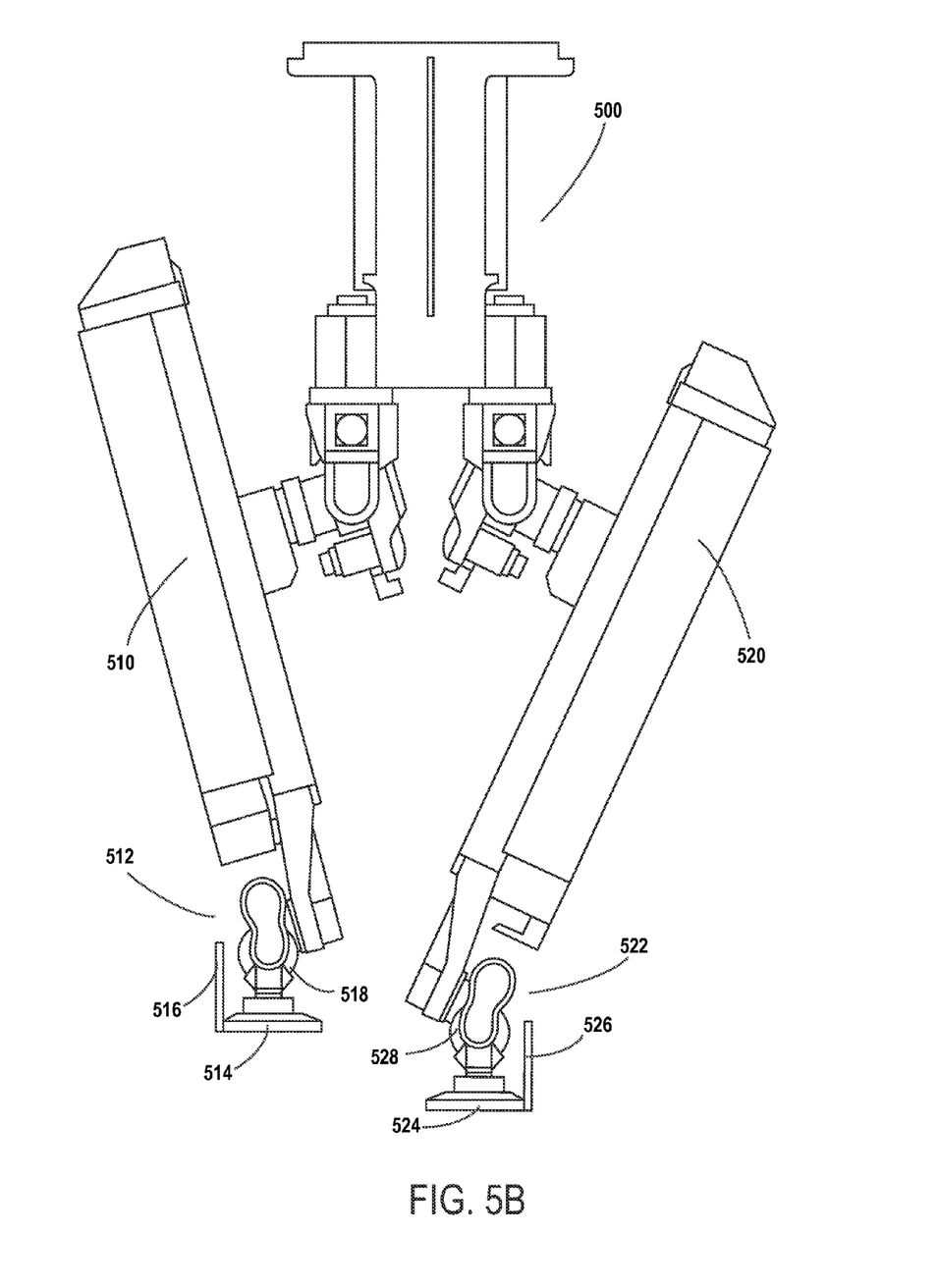

FIG. 5B illustrates a front view of a walking robot, according to an example embodiment. More specifically, the robot 500 may traverse a terrain by moving legs 510, 520 to alternate placements of the first sole 514 of the first foot 512 and the first sole 524 of the second foot 522 on a ground surface. In particular, while the first sole 524 of the second foot 522 is standing on the ground, the robot 500 may move the first foot 512 forward by swinging leg 510. The first sole 514 of the first foot 512 then becomes the support point as the robot 500 moves the second foot 522 forward with the second leg 520. The perpendicular second soles 516, 526 of the two feet 512, 522 may generally not obstruct the walking cycle of the robot 500. In particular, the second soles 516, 526 may not contact the ground surface or other parts of the robot 500 during a typical walking sequence.

In some examples, the ankle joints 518, 528 may be fixed from rotation during a normal walking cycle. Accordingly, a given ankle joint may only be caused to rotate a particular foot of the robot in response to a command from a control system of the robot 500. In some cases, the ankle joints 518, 528 may also be configured to rotate the feet 512, 522 through angles of less than 90 degrees to account for inclinations of the ground surface as opposed to switching the foot into a position where the second sole is contacting the ground surface.

Referring back to FIG. 4, method 400 may further involve determining to cause a given foot of the robot to switch from a first position in which the first sole of the given foot is contacting the ground surface to a second position in which the second sole of the given foot is contacting the ground surface, as shown by block 404. More specifically, a control system of the robot may determine when it would be advantageous or necessary to have the stance foot of the robot rotate onto the second sole, for instance, to avoid the robot losing balance or tipping over. The control system may make a determination to switch the stance foot of the robot from the first position to the second position based on a number of factors, including internal factors (e.g., current joint angles of the robot) and external factors (e.g., detected forces acting on the robot).

Figure 5C:
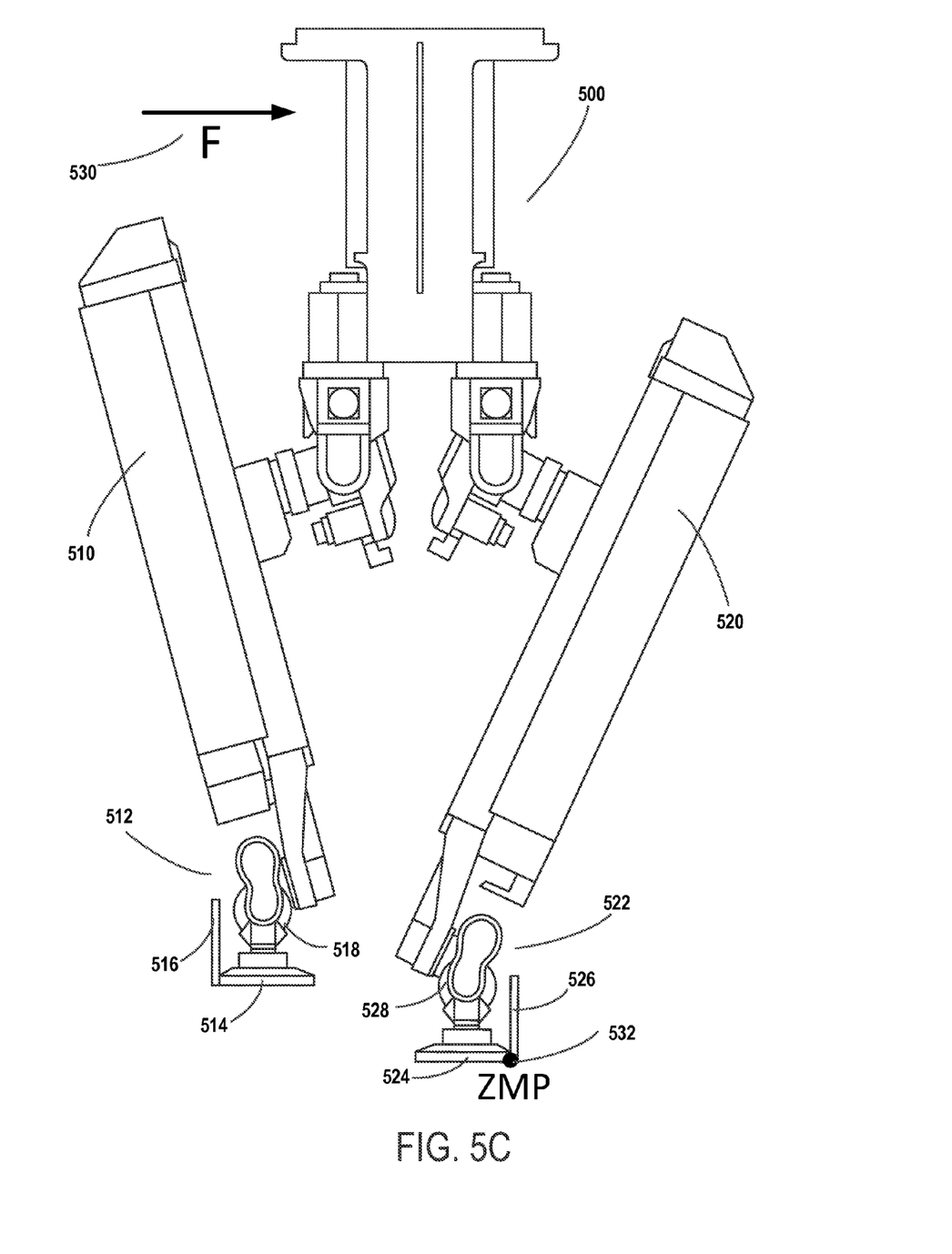

FIG. 5C illustrates a scenario in which a control system of a robot may determine to switch the stance foot of the robot from the first position to the second position, according to an example embodiment. More specifically, a robot 500 may be supported by the first sole 524 of the second foot 522 while swinging the first foot 512 forward with the first leg 510 while the robot 500 is walking. During this motion, the robot 500 may experience an external horizontal force 530 which pushes the robot in a direction toward the stance foot 522. In such a scenario, the robot 500 may attempt to adjust placement of foot 512 in an effort to avoid losing balance as a result of force 530. In some cases, the adjusted target position on the ground for foot 512 to compensate for force 530 may result in a collision between leg 510 and/or foot 512 and leg 520 and/or foot 522.

In some cases, the robot 500 may determine to cause the stance foot 522 to rotate onto the second sole 526 in response to identifying a predicted collision between the two legs 510 and 520 of the robot 500. In particular, the robot 500 may determine a target location to place foot 512 in order to maintain the balance of the robot 500. The target location may be determined to account for external forces, such as force 530. If the target location for foot 514 is predicted to cause a collision between the legs 510 and 520, a control system of the robot 500 may determine to cause the second foot 522 to rotate onto the second sole 526 in an effort to prevent the collision and prevent the robot 500 from tipping over.

In further examples, a control system of the robot 500 may determine to cause the stance foot 522 to rotate onto the second sole 526 after a collision between leg 510 and/or foot 512 and leg 520 and/or foot 522 has occurred. For instance, the control system may not be able to predict that a collision between the legs of the robot is likely to occur, for instance, if the external force 530 is a sudden and unpredicted force. In such a scenario, an actual collision between the legs 510 and 520 of the robot 500 may trigger a rotation of foot 522 by ankle joint 528 in an effort to maintain the balance of the robot.

In additional examples, a control system of the robot may determine when to rotate the stance foot of the robot onto the second sole based on the ZMP on the stance foot. The ZMP is the point on the foot where the total of moments, which is occurred by external forces such as force 530, robot 500's inertia, and robot 500's gravity force, is equal to zero. The ZMP provides an indication of the stability of the robot on the stance foot. As the ZMP moves towards an edge of the foot, the robot may be at risk of rotating around the edge and tipping over. Within examples, the ZMP of the robot on the stance foot may be determined using a force-torque sensor on the leg and/or foot of the robot. In particular, the ZMP can be calculated from a force-torque sensor by comparing the total downwards force against the transverse torque on the foot.

FIG. 5C illustrates an example location of the ZMP 532 on the stance foot 522 of robot 500. Before the robot 500 experiences the horizontal force 530, the ZMP on stance foot 522 may have been located at or near the center of the first sole 524 of foot 522. As a result of the horizontal force 530, the ZMP may move closer to the outer edge of the first sole 524 of foot 522, as illustrated by ZMP 532. A control system of robot 500 may monitor the ZMP 532 on the stance foot 522 (e.g., based on sensor data from a force-torque sensor on foot 522). If the ZMP 532 is determined to be at or near (e.g., with a threshold distance of) the outer edge of first sole 524, the control system of robot may determine to responsively cause the foot 522 to rotate onto second sole 526 in an effort to maintain the balance of robot 500.

In additional examples, a control system of robot 500 may monitor the current joint angles of one or more joints of the robot 500. In some cases, the current joint angles of the robot 500 may indicate that the robot 500 is predicted to tip over or in danger of tipping over. In such a scenario, the control system may determine that a combination of joint angles of the robot 500 expected to result from causing stance foot 522 to rotate onto the second sole 526 may provide improved stability and a decreased risk of causing the robot 500 to tip over. In further examples, the joint angles may also be used to determine when a horizontal force 530 has been experienced by the robot 500 that may indicate that the robot 500 should rotate the foot 522 onto the second sole 526.

Other factors or combinations of factors may be considered by a control system of robot 500 in making a determination as to if and when to actuate the ankle joint 528 of the stance foot 522 in order to rotate the stance foot 522 so that the second sole 526 is contacting the ground surface as well.

Referring back to FIG. 4, method 400 may further involve causing an ankle joint to rotate the stance foot of the robot from the first position in which the first sole of the stance foot is contacting the ground to a second position in which the second sole of the stance foot is contacting the ground, as shown by block 406. In some examples, the ankle joint may rotate the foot through a fixed angle of 90 degrees. In other examples, the ankle joint may rotate the foot until the second sole contacts the ground surface, which may result in the foot being rotated through an angle less than or greater than 90 degrees. The latter embodiment may be useful for a robot that is navigating across uneven terrain.

Figure 5D:
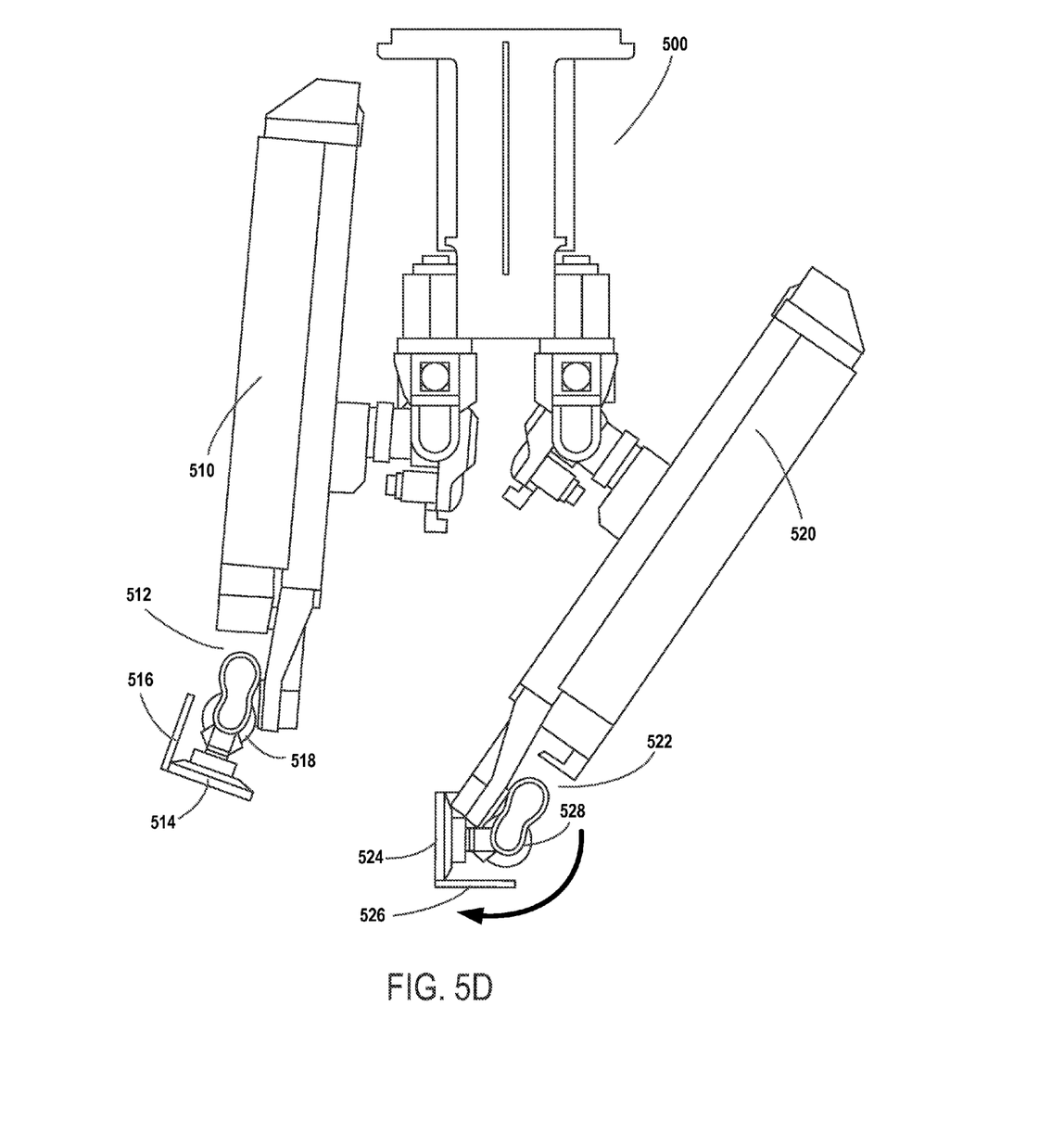

FIG. 5D illustrates a robot with a foot rotated onto a second sole, according to an example embodiment. More specifically, a control system of robot 500 may actuate ankle joint 528 to rotate the foot 522 from a first position in which the first sole 524 is contacting the ground to a second position in which the second sole 526 is contacting the ground. The foot 522 may be rotated around a fixed axis of rotation relative to the leg 520. The arrow in FIG. 5D illustrates the direction of rotation of the foot 522 (e.g., clockwise by 90 degrees). By rotating the foot 522 so that the second sole 526 contacts the ground, the second sole 526 may provide the robot 500 with another chance to catch its balance (e.g., after being pushed from the side while walking).

In particular, the corner of the foot 522 where the first sole 524 connects to the second sole 526 may maintain contact with the same point on the ground during the rotation. Accordingly, the second sole 526 may contact an area of the ground surface adjacent to the area previously contacted by the first sole 524. The second sole 526 therefore provides the robot 500 with the ability to reset its support point in a mechanically simple way. As shown in FIG. 5D, the second sole 526 may contact an area of the ground surface to the right of the area previously contacted by the first sole 524, which may help the robot 500 maintain balance when experiencing a horizontal force from the left.

In some examples, a robot may include two ankle joints that are separately configured to rotate respective feet of the robot in opposite directions at separate times. For instance, at a separate point in time when the first foot 512 of robot 500 is contacting the ground surface with first sole 514, the ankle joint 518 of foot 512 may be controlled to rotate the foot 512 by 90 degrees in a counterclockwise direction in order to cause the second sole 516 to contact the ground surface. The second sole 516 of foot 512 may therefore provide the robot 500 with another opportunity to catch its balance when pushed in an opposite direction than illustrated and described with respect to FIG. 5C.

Figure 5E:
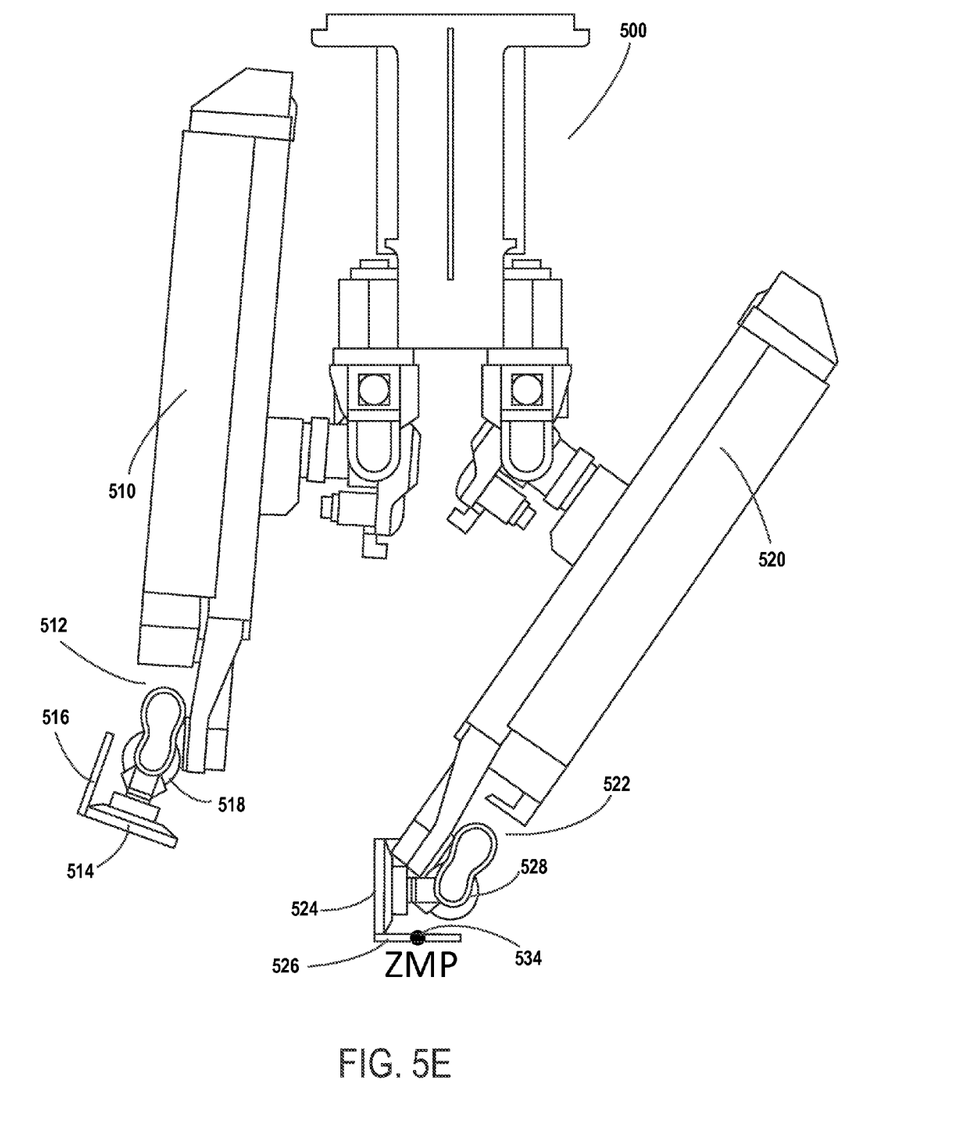

FIG. 5E illustrates another ZMP on a stance foot of a robot, according to an example embodiment. More specifically, after the robot 500 rotates foot 522 so that the second sole 526 is contacting the ground surface, the ZMP of robot 500 may be located in the middle of the second sole 526 of foot 522, as illustrated by ZMP 534. Because the second sole 526 contacts a portion of the ground further to the right than the portion previously contacted by the first sole 524, the location of ZMP 534 on the second sole 526 may provide improved stability for the robot 500. Additionally, rotation of the foot 522 onto the second sole 534 may also provide the robot 500 with extra time to adjust its body position (e.g., by moving leg 510) to compensate for an unexpected horizontal force without tipping over.

After reaching the position illustrated in FIG. 5E, the robot 500 may return foot 522 to a position in which the first sole 524 contacts the ground surface before continuing to walk across a terrain. For instance, the robot 500 may first plant the first sole 514 of foot 512, and then may cause ankle joint 528 to rotate foot 528 (e.g., by 90 degrees in a counterclockwise direction) so that the first sole 524 is contacting the ground before the robot 500 takes another step with foot 522.

In other examples, the robot 500 may be configured to take one or more additional steps with foot 522 before rotating the foot 522 back to a position in which the first sole 524 is contacting the ground. For instance, the robot 500 may take one or more steps on the second sole 526 before rotating the foot 522 back onto the first sole 524 to ensure that any external obstacles or forces that may have caused the robot 500 to rotate the foot 522 onto the second sole 526 have been cleared before attempting to rotate the foot 522 back onto the first sole 524.

In further examples, the second perpendicular sole of a foot may be connected along a different edge of the first sole. For instance, the second sole 516 of foot 512 may be connected to the first sole 514 along the front edge or back edge to help compensate for pushes from the back or from the front. In other examples, multiple perpendicular soles may connected to different edges of the first sole 514, in which case the ankle joint 518 may be capable of rotating the foot 512 around two or more different axis of rotation. Within examples, a robot may also have different numbers or arrangements of legs and/or feet than illustrated in FIGS. 5A-5E.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A robotic device, comprising:
    a first leg and a second leg, wherein each leg comprises:
        a foot comprising a first sole and a second sole perpendicular to the first sole; and
        an ankle joint configured to rotate the foot from a first position in which the first sole is contacting a ground surface to a second position in which the second sole is contacting the ground surface, wherein the second sole of the foot of the first leg is connected to the first sole at an outer edge that is opposite the second leg, and wherein the second sole of the foot of the second leg is connected to the first sole at an outer edge that is opposite the first leg; and
    a control system configured to:
        when the foot of a given leg of the first leg and the second leg is in the first position, determine to cause the foot of the given leg to switch from the first position to the second position; and
        cause the ankle joint of the given leg to rotate the foot of the given leg from the first position to the second position.

2. The robotic device of claim 1, wherein the control system is further configured to:
    determine that a zero moment point on the foot of the given leg is located at the outer edge of the foot of the given leg; and
    determine to cause the foot of the given leg to switch from the first position to the second position in response to determining that the zero moment point on the foot of the given leg is located at the outer edge of the foot of the given leg.

3. The robotic device of claim 2, wherein each leg further comprises at least one force-torque sensor, and wherein the control system is further configured to determine the zero moment point on the foot of the given leg based on sensor data received from the at least one force-torque sensor on the given leg.

4. The robotic device of claim 1, wherein the control system is further configured to:
    detect a collision between the first leg and the second leg; and
    determine to cause the foot of the given leg to switch from the first position to the second position in response to detecting the collision between the first leg and the second leg.

5. The robotic device of claim 1, wherein the control system is further configured to:
    detect a horizontal force experienced by the robotic device; and
    determine to cause the foot of the given leg to switch from the first position to the second position in response to detecting the horizontal force experienced by the robotic device.

6. The robotic device of claim 1, wherein the control system is further configured to:
    determine one or more joint angles of one or more joints of the first leg and the second leg; and
    determine to cause the foot of the given leg to switch from the first position to the second position based on the one or more determined joint angles.

7. The robotic device of claim 6, wherein the control system is further configured to:
    determine that the robotic device is predicted to fall based on the one or more determined joint angles; and
    determine to cause the foot of the given leg to switch from the first position to the second position in response to determining that the robotic device is predicted to fall.

8. The robotic device of claim 1, wherein the first sole of a given foot has a same shape as the second sole of the given foot.

9. A method comprising:
    providing instructions for a robotic device to walk on a ground surface by alternatively placing a first sole of a first foot and a first sole of a second foot on the ground surface, wherein the first foot is attached to a first leg and the second foot is attached to a second leg;
    identifying a horizontal force experienced by the robotic device;
    when a given foot of the first foot and the second foot is on the ground surface, determining to cause the given foot to switch from a first position in which the first sole of the given foot is contacting the ground surface to a second position in which a second sole of the given foot is contacting the ground surface in response to identifying the horizontal force experienced by the robotic device, wherein the first sole of the given foot of the robotic device is perpendicular to the second sole of the given foot of the robotic device; and causing an ankle joint of a given leg to which the given foot is attached to rotate the given foot from the first position in which the first sole of the given foot is contacting the ground surface to the second position in which the second sole of the given foot is contacting the ground surface.

10. The method of claim 9, wherein:
the second sole of the first foot of the robotic device is connected to the first sole of the first foot at an outer edge that is opposite the second foot; and
the second sole of the second foot of the robotic device is connected to the first sole of the second foot at an outer edge that is opposite the first foot.

11. The method of claim 9, further comprising:
causing the ankle joint of the given leg to which the given foot is attached to rotate the given foot from the second position in which the second sole of the given foot is contacting the ground surface back to the first position in which the first sole of the given foot is contacting the ground surface.

12. The method of claim 9, further comprising:
providing instructions for the robotic device to continue to walk on the ground surface by contacting the ground surface with the second sole of the given foot.

13. A robotic device, comprising:
at least two legs, wherein each leg comprises:
    a foot comprising a first sole and a second sole perpendicular to the first sole; and
    an ankle joint configured to rotate the foot from a first position in which the first sole is contacting a ground surface to a second position in which the second sole is contacting the ground surface; and
a control system configured to:
    determine one or more joint angles of one or more joints of the at least two legs;
    when the foot of a given leg of the at least two legs is in the first position, determine to cause the foot of the given leg to switch from the first position to the second position based on the one or more determined joint angles; and
    cause the ankle joint of the given leg to rotate the foot of the given leg from the first position to the second position.

14. The robotic device of claim 13, wherein:
the at least two legs comprise a first leg and a second leg;
the second sole of the foot of the first leg is connected to the first sole at an outer edge that is opposite the second leg; and
the second sole of the foot of the second leg is connected to the first sole at an outer edge that is opposite the first leg.

15. The robotic device of claim 14, wherein the control system is further configured to:
determine that a zero moment point on the foot of the given leg is located at the outer edge of the foot of the given leg; and
determine to cause the foot of the given leg to switch from the first position to the second position in response to determining that the zero moment point on the foot of the given leg is located at the outer edge of the foot of the given leg.

16. The robotic device of claim 15, wherein each leg further comprises at least one force-torque sensor, and wherein the control system is further configured to determine the zero moment point on the foot of the given leg based on sensor data received from the at least one force-torque sensor on the given leg.

17. The robotic device of claim 14, wherein the control system is further configured to:
detect a collision between the first leg and the second leg; and
determine to cause the foot of the given leg to switch from the first position to the second position in response to detecting the collision between the first leg and the second leg.

18. The robotic device of claim 13, wherein the control system is further configured to:
detect a horizontal force experienced by the robotic device; and
determine to cause the foot of the given leg to switch from the first position to the second position in response to detecting the horizontal force experienced by the robotic device.

19. The robotic device of claim 13, wherein the control system is further configured to:
determine that the robotic device is predicted to fall based on the one or more determined joint angles; and
determine to cause the foot of the given leg to switch from the first position to the second position in response to determining that the robotic device is predicted to fall.

20. The robotic device of claim 13, wherein the first sole of a given foot has a same shape as the second sole of the given foot.

* * * * *